US009425888B2

(12) United States Patent
Tong et al.

(10) Patent No.: US 9,425,888 B2
(45) Date of Patent: Aug. 23, 2016

(54) METHODS AND SYSTEMS FOR PROVIDING HIGH-SPEED CONNECTIVITY TO AIRCRAFT

(75) Inventors: Roger Shun Hong Tong, Hong Kong (HK); Fred Chun Yin Vong, Hong Kong (HK); Harry Yin Chung Leung, Hong Kong (HK)

(73) Assignee: Asia Satellite Telecommunications Company Limited, Hong Kong (CN)

( * ) Notice: Subject to any disclaimer, the term of this patent is extended or adjusted under 35 U.S.C. 154(b) by 1020 days.

(21) Appl. No.: 13/569,980

(22) Filed: Aug. 8, 2012

(65) Prior Publication Data

US 2014/0045420 A1    Feb. 13, 2014

(51) Int. Cl.
*H04B 7/185* (2006.01)
*H04B 17/02* (2006.01)
*H04B 1/60* (2006.01)

(52) U.S. Cl.
CPC ................. *H04B 7/18506* (2013.01)

(58) Field of Classification Search
CPC ...... H04B 7/18506; H04B 7/185; H04B 1/60; H04B 17/02; H01Q 1/3275; H04N 7/20
USPC ............ 455/427, 3.02, 428, 431, 432.1, 12.1, 455/11.1, 13.1, 13.2, 13.3, 63.2
See application file for complete search history.

(56) References Cited

U.S. PATENT DOCUMENTS

| 6,020,845 | A  | * | 2/2000  | Weinberg et al. | 342/354 |
|---|---|---|---|---|---|
| 6,185,409 | B1 | * | 2/2001  | Threadgill et al. | 455/12.1 |
| 6,278,861 | B1 | * | 8/2001  | Ward et al. | 455/13.1 |
| 6,529,706 | B1 | * | 3/2003  | Mitchell | 455/12.1 |
| 7,061,432 | B1 | * | 6/2006  | Tavassoli Hozouri | H01Q 21/065 343/700 MS |
| 7,505,736 | B2 | * | 3/2009  | Min | 455/12.1 |
| 8,442,519 | B2 | * | 5/2013  | Cruz et al. | 455/431 |
| 8,499,324 | B1 | * | 7/2013  | Mitchell et al. | 725/76 |
| 2002/0008669 | A1 | * | 1/2002 | Muhlhauser | H01Q 3/2658 343/840 |
| 2002/0058478 | A1 | * | 5/2002 | de La Chapelle et al. | 455/13.4 |
| 2005/0143005 | A1 | * | 6/2005 | Moore, III | H04B 7/18521 455/13.1 |
| 2006/0176843 | A1 | * | 8/2006 | Gat | H04B 7/18523 370/316 |
| 2010/0188304 | A1 | * | 7/2010 | Clymer et al. | 343/753 |
| 2010/0218224 | A1 | * | 8/2010 | Gat et al. | 725/72 |
| 2011/0215985 | A1 | * | 9/2011 | Kaplan et al. | 343/879 |
| 2011/0263199 | A1 | * | 10/2011 | Cruz et al. | 455/12.1 |

(Continued)

OTHER PUBLICATIONS eHOW, What is the Altitude of a Plane in Flight?, http://www.ehow.com/facts_5061375_altitude-plane-flight.html, accessed Aug. 8, 2012, 5 pages.

(Continued)

*Primary Examiner* — Pablo Tran
(74) *Attorney, Agent, or Firm* — Hanley, Flight & Zimmerman, LLC.

(57) ABSTRACT

Methods for providing high-speed connectivity to an aircraft in flight from a satellite. Example methods include transmitting first radio frequency signals from a wide-beam antenna at the satellite at a beamwidth of at least 6 degrees orbital arc to provide a wide coverage area. The first radio frequency signals are transmitted at a first frequency of at least 10 gigahertz and at a low equivalent isotropic radiated power. The method also includes receiving second radio frequency signals from a mobile antenna located on the aircraft, wherein the second radio frequency signals are received at a second frequency of at least 13.75 gigahertz, and the second frequency is different than the first frequency.

19 Claims, 5 Drawing Sheets

(56) References Cited

U.S. PATENT DOCUMENTS

2014/0195150 A1* 7/2014 Rios .............................. 701/469
2014/0302869 A1* 10/2014 Rosenbaum .......... H04W 4/026
　　　　　　　　　　　　　　　　　　　　　　　　455/456.1

OTHER PUBLICATIONS

Thurma Freed, Has in-Flight Internet Connectivity Finally Arrived?, http://ezinearticles.com/?Has-in-Flight-Internet-Connectivity-Finally-Arrived?&id=6824616, accessed Aug. 8, 2012, 1 page.

Delta Airlines, In-flight Wi-Fi Access, http://www.delta.com/traveling_checkin/inflight_services/products/wi-fi.jsp, accessed Aug. 8, 2012, 2 pages.

Asia Satellite Telecommunications Company Limited, Wildblue and Tetesat—Ka band spot beam satellite-Anik F2, http://www.satsig.net/ka-band-anik-f2-wildblue-telesat.htm, accessed Aug. 8, 2012, 3 pages.

* cited by examiner

METHODS AND SYSTEMS FOR PROVIDING HIGH-SPEED CONNECTIVITY TO AIRCRAFT

TECHNICAL FIELD

The present application relates to satellite communications, and more particularly to methods and systems for providing high-speed connectivity to an aircraft from a satellite.

BACKGROUND

Operators of commuter transportation often provide communication services to their customers while on-board the transportation vehicles. For example, airline operators may provide internet access, telephone services, and real-time television and radio to their passengers during in-flight travel. These communication services are often provided via communication satellites. That is, the transportation vehicles may be equipped with equipment to communicate with the communication satellites and accordingly provide communication services to the on-board customers during travel. For example, an airplane may be equipped to communicate with the AsiaSat 3S satellite by Asia Satellite Telecommunications, which provides communication coverage to Asia and Australasia, when travelling within the coverage area of the AsiaSat 3S satellite. Similarly, an airplane may be equipped to communicate with the Telesat ANIK F-2 satellite by Tele-Sat Canada, which provides communication coverage to portions of North America, when travelling within the coverage area of the Telesat ANIK F-2 satellite.

Communication satellites are generally designed to provide communication coverage for non-mobile terminals and within a fixed area. Accordingly, transportation vehicles, such as airplanes, often need to be equipped with complex equipment in order to provide communication services via communication satellites to their customers. The installation and service of the complex equipment results in higher costs to the operators that are often passed on to their customers when utilizing the communication services. For example, certain U.S. airline operators may charge customers up to $13.00 per domestic flight trip for the usage of on-board internet services. Additionally, the characteristics of the communication satellites may provide limitations on the design of the equipment on the airplanes to receive effective communication coverage (for example, there may be adjacent satellite interference). This reduces the performance of the communication services during travel providing for a poor user experience for customers.

Airline operators have adopted other systems beyond communication satellites to provide on-board communication services. For example, airline operators have equipped airplanes to communicate with transceiver base station towers operated by a third-party to provide communication services. An example of such a third-party is Gogo. However, communication services provided by such systems also suffer from poor performance due to design limitations. For example, the on-board internet connection speed provided by the Gogo network is typically less than 500 kilobits per second (kbps) for downloading and 300 kbps for uploading.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
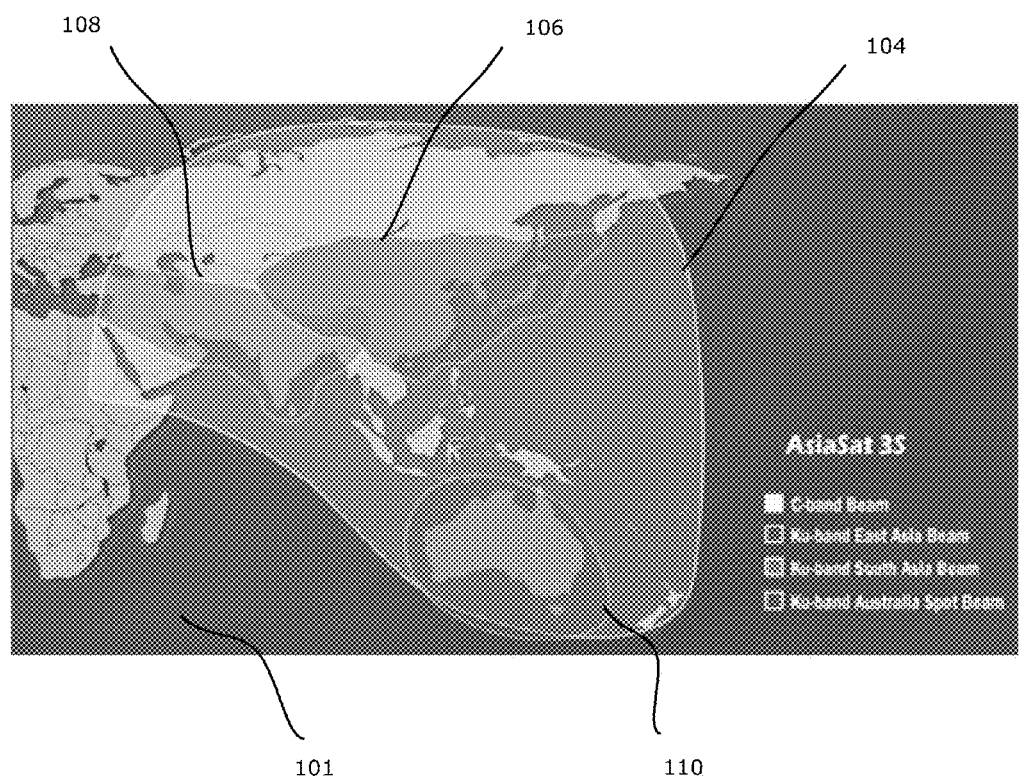
FIG. 1 is an example communication coverage provided by an example satellite.

In one aspect, the present application describes methods for providing high-speed connectivity to an aircraft in flight from a satellite. Example methods include transmitting first radio frequency signals from a wide-beam antenna at the satellite at a beamwidth of at least 6 degrees orbital arc to provide a wide coverage area. The first radio frequency signals are transmitted at a first frequency of at least 10 gigahertz and at a low equivalent isotropic radiated power. The method also includes receiving second radio frequency signals from a mobile antenna located on the aircraft, wherein the second radio frequency signals are received at a second frequency of at least 13.75 gigahertz, and the second frequency is different than the first frequency.

In another aspect, the present application describes a satellite system for providing high-speed connectivity to an aircraft in flight. The satellite system includes a wide-beam antenna; a transmitter configured to transmit first radio frequency signals from the wide-beam antenna at the satellite at a beamwidth of at least 6 degrees orbital arc to provide a wide coverage area, wherein the first radio frequency signals are transmitted at a first frequency of at least 10 gigahertz and at a low equivalent isotropic radiated power; and a receiver configured to receive second radio frequency signals from a mobile antenna located on the aircraft, wherein the second radio frequency signals are received at a second frequency of at least 13.75 gigahertz, and the second frequency is different than the first frequency.

The present application provides for a system and method that enables communications connectivity for aircraft over a broad area. In one aspect, a satellite provides communications connectivity to aircraft while in-flight using a wide-beam antenna to realize a broad coverage area. In order to provide such coverage in spite of the difficulties of managing possible interference with adjacent satellites and negotiating frequency coordination with adjacent satellite operators, the present application describes an example system in which the satellite-to-aircraft downlink uses an antenna configuration that provides wide beamwidth with relatively flat response across the beampattern, and with relatively low and flat effective isotropic radiated power (EIRP) through its coverage area, and yet uses a high frequency (such as above 10 GHz). In one example, the beamwidth is at least 6 degrees orbital arc. In many implementations the beamwidth is substantially larger. The EIRP is low enough to avoid causing interference to adjacent satellites and ground stations for those satellites, yet is sufficient to provide effective connectivity to aircraft travelling at high altitude in the coverage area. Through balancing these factors for a suitable implementation the satellite provides effective communications coverage to airborne aircraft through a broad coverage area using a high frequency band and without causing interference problems with adjacent operators.

Other example embodiments of the present disclosure will be apparent to those of ordinary skill in the art from a review of the following detailed description in conjunction with the drawings.

Example embodiments of the present disclosure are not limited to any particular type of satellite or antenna. Additionally, the present disclosure is not limited to any type of aircraft which may include manned and unmanned aircraft.

Satellite Overview

Satellites are devices positioned in orbital space that are used for various purposes. In one example embodiment, the satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

In at least some example embodiments, the two end-points may include a ground station (which may be stationary) at one point, and a mobile terminal at the other point. The ground station may be controlled by an operator of communication services, and is equipped with an antenna (which may be referred to as a stationary antenna) to transmit and receive communication signals. The mobile terminal is also equipped with an antenna (which may be referred to as a mobile antenna) to receive and transmit communication signals. In order for communications to occur between the ground station and the mobile terminal, the satellite provides a communication link. That is, the satellite provides a transmission path for relaying communication signals between the ground station and the mobile terminal.

For example, in at least some example embodiments, a forward uplink may be established between the ground station and the satellite for transmitting communication signals from the ground station to the satellite. A forward downlink is then established between the satellite and the mobile terminal for relaying the communication signals from the satellite to the mobile terminal. In such example embodiments, a return uplink may be established between the satellite and the mobile terminal for transmitting communication signals from the mobile terminal to the satellite. A return downlink is also established between the satellite and the ground station for relaying the communication signals from the mobile terminal to the ground station.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the satellites have a circular orbit above the Earth's equator and follow the direction of the Earth's rotation. A satellite in such an orbit has an orbital period equal to the Earth's rotational period, and accordingly may appear at a fixed position in the sky for ground stations.

Communication satellites are typically spaced apart along the geostationary orbit. That is, the satellites are positioned in orbital slots. The satellite operators coordinate their use of orbital slots with each other under international treaty by the International Telecommunication Union, and the separation between slots depends on the coverage and frequency of operation of the satellites. For example, in at least some example embodiments, the separation between satellites may be between 2-3 degrees of orbital longitude. In at least some example embodiments, the separation between satellites may be less than 2 degrees of separation. The separation of the satellites in such a manner allows for frequency reuse for both uplink and downlink transmission. For example, by separating adjacent satellites by a distance greater than the transmitting beamwidth (i.e. the angle, measured in a horizontal plane, between the directions at which the power of the beam is at least one-half its maximum value) of an antenna associated with the ground station for uplink transmission, the same frequency for the communication signals may be employed to uplink to adjacent satellites with interference at or below the coordinated level. Similarly, if the separated distance between the adjacent satellites is greater than the receiving beamwidth of the antenna associated with the ground station for downlink transmission, the same frequency for the communication signals may be employed to downlink from adjacent satellites with interference at or below the coordinated level.

In order to perform communication functions, the satellite is equipped with various components. For example, the satellite may include a communication payload (which may further include transponders, one or more antennas, and switching systems), engines (to bring the satellite to the desired orbit), tracking and stabilization systems (used to the orient the satellite and to keep the satellite in the right orbit), power subsystems (to power the satellite) and command and control subsystems (to maintain communication with ground control stations).

The transponder of the satellite forms a communication channel between two end-points (for example, the ground station and the mobile terminal) to allow for communications between the two end-points. The transponder also defines the capacity of the satellite for communications.

The antenna of the satellite transmits and receives communication signals. More specifically, the antenna is an electronic component that converts electric currents (which may be generated by a transmitter) to propagating radio frequency (RF) signals during transmission, and converts induced RF signals to electric currents during reception. In at least some example embodiments, the antenna may be associated with an amplifier which may amplify the power of the transmitted or received RF signals.

The power of the RF signals radiated by the antenna may be described in terms of the equivalent isotropically radiated power (EIRP). The EIRP is associated with a contour which defines the coverage pattern of the emitted power. That is, for a shaped beam, there may be some regions that have a higher power than other regions. For example, the middle of the beam may have a higher power than the edges of the beam. The EIRP takes into account the gain of the antenna, the power of a transmitter associated with the antenna (which may be the power of the amplifier), and transmission losses (i.e. power loss between the transmitter (or amplifier) and the antenna). The EIRP value may be provided in units of decibel-watts (dBW). In at least some example embodiments, the EIRP emitted may be adjusted for various purposes such as to minimize interference of the antenna with adjacent satellites by for example, controlling the power of the transmitter (or the amplifier).

The gain of the antenna is a performance figure which combines the antenna's directivity and electrical efficiency. The antenna's directivity is a figure of merit which measures the power density the antenna radiates in the direction of its strongest emission against the same power density over all directions. The electrical efficiency is also a figure of merit which measures the electrical losses that occur in the antenna. The gain describes how well the antenna converts electrical power into RF signals headed in a specific direction. The antenna gain is defined as the ratio of the power produced by the antenna to the power produced by a hypothetical lossless isotropic antenna (that radiates power equally in all directions). The antenna gain may be provided in units of decibels-isotropic (dBi). It is also noted that the gain of an antenna is related to the antenna size. That is, the larger the antenna, the larger the gain of the antenna. Conversely, the smaller the antenna, the smaller the gain of the antenna.

The communication signals may be microwave signals. Microwave signals are RF signals that have wavelengths ranging from as long as one meter to as short as one millimeter. Equivalently, the frequency of the RF signals may range from 300 MHz to 300 GHz. More particularly, the communication signals are within certain frequency bands of microwave signals as they are more suited for satellite communications. For example, in at least some example embodiments, a satellite may operate within the frequency of the C-band. The C-band is a portion of the electromagnetic spectrum that ranges from approximately 4 GHz to 8 GHz. That is, the communication signals are transmitted by and received at the satellite within such a frequency range.

The C-band is considered a low frequency range for satellite communication signals. Accordingly, a satellite operating within the C-band may have a wide beamwidth that defines the coverage area of the satellite. For example, a satellite operating within the C-band may only require several beams to cover the global surface due to the width of the beams. That is, the satellite may provide communications to the entire globe with a fewer number of beams. A satellite that provides fewer beams with greater coverage may provide seamless coverage to mobile terminals over greater distances, and may not require as many ground stations.

Antennas of end-points (for example, a ground station) that are configured to communicate with satellites within the C-band frequency are generally larger than 1.2 meters in size. For example, the diameter of a dish antenna associated with a ground station may be larger than 1.2 meters in size. Such an antenna size is required to prevent signal interference with adjacent satellites operating within the C-band. C-band satellites may have separation of at least 3 degrees of orbital longitude from one another. The ground antenna needs to be of a certain size in order to minimize the interference of off-axis EIRP (i.e. the power of the RF signals that are radiated away from the main lobe (which is the lobe that has the maximum power of transmission of the RF signals) within an antenna pattern; which may be referred to as the power of the side lobes) with the signals of adjacent satellites. For example, a 1.2 meter antenna at an end-point for C-band frequency operation may have an uplink EIRP of approximately 50 dBW and an off-axis EIRP of 41 dBW. Such an off-axis EIRP will interfere with an adjacent satellite and degrade the performance of the communication link between the antenna and the satellite.

In at least some example embodiments, the satellite may operate within frequencies higher than the C-band. That is, the satellite may operate within frequencies higher than 8 GHz. For example, the satellite may operate within the frequency of the Ku-band. The Ku-band is the portion of the electromagnetic spectrum that ranges from approximately 10 GHz to 18 GHz. That is, the communication signals are transmitted by and received at the satellite within such a frequency range.

The Ku-band is considered a high frequency range for satellite communication signals. Higher frequency signals are more susceptible to atmospheric attenuation, for example due to moisture in the air and rain fade. Accordingly, a satellite operating within the Ku-band may have a more focussed narrow beamwidth that defines the coverage area of the satellite so as to focus its radiated power. For example, the beamwidth of a satellite operating within the Ku-band may be a spot beam having less than 2 degrees orbital arc. The narrow beamwidth provides a limited coverage area of the satellite.

Adjacent Ku-band satellites may have an orbital separation dependent upon the size of the ground antennas being used. For example, with 0.65 meter DTH antennas using Ku-band, at least 2.5 degrees separation is typical for satellites having similar power and frequency. With larger ground antennas, the separation can be narrowed slightly.

The narrow beams of a satellite operating within the Ku-band are typically broadcast with a high EIRP. That is, the RF signals are transmitted with concentrated power so as to overcome atmospheric attenuation and rain fade and to allow for smaller receiving antennas. For example, the EIRP of the beams may be emitted at higher than 54 dBW. In order to achieve high EIRP of the beams, the coverage areas of the beams are narrow to concentrate the power. Beams transmitted with a narrow beamwidth may be referred to as spot beams. Accordingly, a satellite may provide multiple spot beams in order to extend the coverage area of the satellite. The use of multiple spot beams allows for frequency reuse by the satellite. That is, the satellite may transmit varied RF signals using the same frequency for different regions of coverage by the spot beams. If a frequency within a coverage area of a spot beam is far enough away from the same frequency within a coverage area of another spot beam, then the RF signals may be transmitted without interference.

Additionally, the high EIRP spot beams counter the effects of rain fade. Rain fade is the absorption of RF signals by atmospheric rain, snow and/or ice that results in the degradation of a communication link between a satellite and an end-point. The attenuation cause by rain fade increases with frequency. That is, frequencies within the Ku-band and higher are more susceptible to rain fade, while frequencies lower than the Ku band such as the C-band are less susceptible to the effects of rain fade. There is a direct relationship between atmospheric attenuation of RF signals due to rain fade and the frequency of the RF signals. Accordingly, a satellite operating within the Ku-band may transmit beams with a high EIRP in order to minimize the effects of rain fade and establish a communication link with an end-point on the earth's surface.

Antennas of end-points that are configured to communicate with satellites within the Ku-band are generally significantly smaller than 1.2 meters in size. For example, the diameter of a dish antenna associated with a mobile terminal and/or a ground station may be smaller than 1.2 meters in size. In at least some example embodiments, the antenna size may be small as 0.68×0.18 meters in size.

In at least some example embodiments, the satellite may operate within other high frequencies, above the Ku-band. For example, the satellite may operate within the Ka-band frequency. The Ka-band is the portion of the electromagnetic spectrum that ranges from approximately 26.5 GHz to 40 GHz (at present the assigned slots for fixed satellite service (FSS) are 27-31 GHz for uplink and 17.7-21.2 GHz for downlink).

Satellites operating within the Ka-band may have similar characteristics as satellites operating within the Ku-band. For example, a satellite operating within the Ka-band may have a narrow beamwidth (which may be less than 1.5 degrees orbital arc), and may provide multiple spot beams to extend the coverage area. The multiple spot beams may be provided with a high EIRP (for example, the EIRP of the beams may be emitted at higher than 61 dBW).

It will be appreciated that the satellites may operate within other microwave frequency bands. For example, the satellites may operate in any one of the defined microwave frequency bands ranging in frequencies from approximately 1 GHz to 170 GHz. Examples of such frequency bands may include the X-band, Q-band, the V-Band, etc. Reference herein to "high frequency" are intended to mean frequencies in the Ku-band or above, including the Ka-band, X-band, Q-band, V-band, etc.

Reference is now made to FIG. 1 which illustrates an example communication coverage provided by an example satellite. More specifically, FIG. 1 shows the coverage areas of the satellite, AsiaSat 3S by Asia Satellite Telecommunications, for different frequency bands of operation.

The eastern hemisphere map 101 includes Asia, Australasia and portions of Africa and Europe. The C-band beam coverage 104 of AsiaSat 3S includes the region of Asia, Australasia and most of Russia as shown on the eastern hemisphere map 101. The C-band beam coverage 104 is a wide area of coverage as the beamwidth may be wider at a lower frequency of operation of the satellite due to lower rain fade. Accordingly, communication links may be established between the satellite and end-points (for example, a mobile terminal and/or a ground station) that are located within the C-band beam coverage 104 area and are compatible to operate within the C-band frequency.

The AsiaSat 3S satellite also provides multiple Ku-band coverage. That is, the satellite provides a Ku-band East-Asia beam coverage 106, a Ku-band South-Asia beam coverage 108 and a Ku-band Australia beam coverage 110. The Ku-band East-Asia beam coverage 106 covers the regions of China, Hong Kong, Japan, South Korea and North Korea. The Ku-band South-Asia coverage 108 covers the regions of Indian subcontinent, Iran and portions of the middle-east. The Ku-band Australia beam coverage 110 primary covers the region of Australia. The Ku-band beam coverage areas are smaller areas of coverage relative to the C-band beam coverage 104 areas, as the beamwidth may be narrower at a higher frequency of operation of the satellite. Accordingly, communication links may be established between the satellite and end-points (for example, a mobile terminal and/or a ground station) that are located within the Ku-band beam coverage areas and are compatible to operate within the Ku-band frequency.

Figure 2:
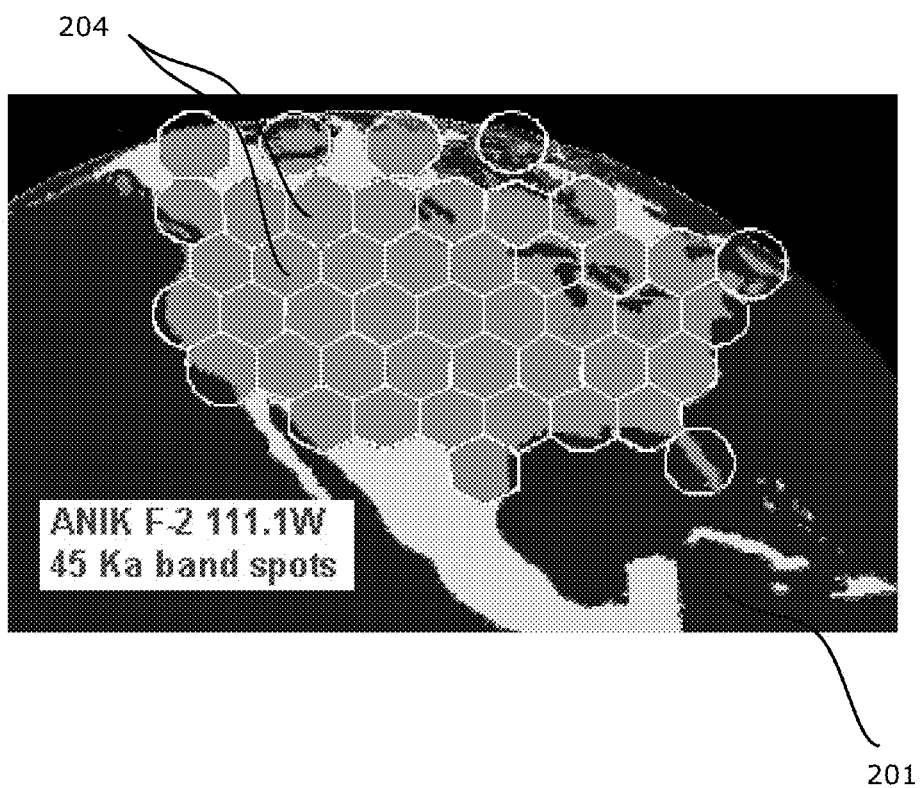
FIG. 2 is another example communication coverage provided by another example satellite.

Reference is next made to FIG. 2 which illustrates another example communication coverage provided by another example satellite. More specifically, FIG. 2 shows the coverage areas of the satellite ANIK F-2 by TeleSat Canada for the Ka-band of operation.

The North American map 201 includes the region of North America and portions of the Caribbean. The ANIK F-2 satellite provides multiple Ka-band spot beam coverage 204 that covers most of the regions of the United States and Canada as shown on the North American map 201. More particularly, the satellite provides 45 Ka-band spot beam coverage 204 to extend the coverage area of the satellite. Each Ka-band spot beam coverage 204 is a small area of coverage as the beamwidths may be narrower at a higher frequency of operation (and also a higher EIRP). Accordingly, communication links may be established between the satellite and end-points (for example, a mobile terminal and/or a ground station) that are located within the Ka-band spot beam coverage 204 areas and are compatible to operate within the Ka-band frequency. The ANIK F-2 satellite may also apply frequency reuse when communicating with end-points as multiple spot beams are provided.

It is noted that when an end-point, such as a mobile terminal, moves from one Ka-band spot beam coverage 204 area to another Ka-band spot beam coverage 204 area, the end-point may need to perform complex frequency, baseband and connectivity switching operations in order to maintain a communication link between itself and the ANIK F-2 satellite.

Providing High-Speed Connectivity to an Aircraft

The satellite may be configured to provide high-speed connectivity to mobile terminals such as an aircraft. That is, the satellite may be designed to establish a fast and efficient communication link between itself and the aircraft. Accordingly, the aircraft may obtain communication services such as telephone, television, radio and/or internet services at high-speeds with minimal interruption. In many examples, the aircraft is a manned aircraft, including commercial or non-commercial flights; but the present application is not limited to manned aircraft and may be applied to communications with unmanned aircraft.

Figure 3:
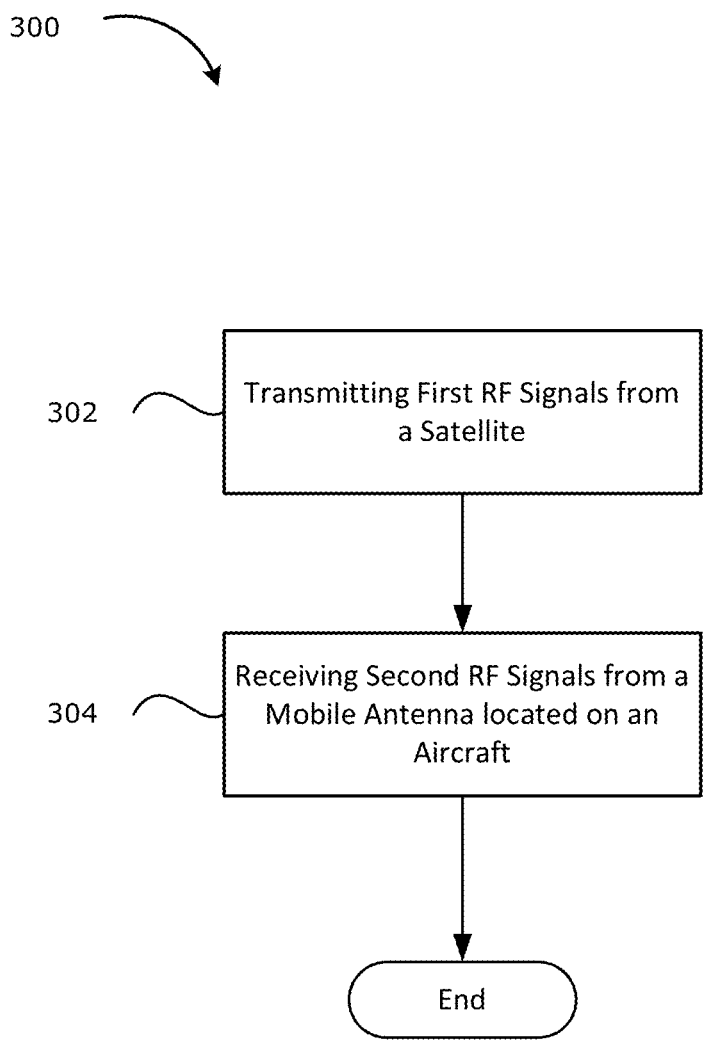
FIG. 3 is a flowchart illustrating an example method of providing high-speed connectivity to an aircraft from a satellite in accordance with example embodiments of the present disclosure.

One example method 300 of providing high-speed connectivity to an aircraft from a satellite is now illustrated in flow-chart form with reference to FIG. 3. It will be appreciated that portions of the method 300 may be implemented by the satellite and portions of the method 300 may be implemented by the aircraft. One or more components associated with the satellite may perform the satellite-specific operations (such as a wide-beam antenna associated with the satellite), and one or more components associated with the aircraft may perform the aircraft-specific operations (such as a mobile antenna associated with the aircraft). It will also be appreciated that the satellite may be a communication satellite, and may be of the type described above.

As noted above, to provide wide area connectivity to aircraft in-flight, the present application proposes a satellite system that uses a high frequency, wide-beam antenna, operated at relatively low EIRP so as to achieve connectivity over a broad coverage area at high altitude, but without causing harmful interference issues and difficult coordination problems at ground level for other operators. The wide-beam antenna is adapted to have a relatively flat power pattern across its coverage area to enable the satellite to operate it with a relatively low peak EIRP yet achieve a wide beamwidth.

Method 300 includes, at operation 302, transmitting first RF signals from the satellite using a wide-beam antenna having a beamwidth of at least 6 degrees orbital arc to provide a wide coverage area. The first RF signals are transmitted at a first frequency of at least 10 GHz and at a low EIRP. Typically, high frequency satellite signals are broadcast using beamwidths of 2 degrees or less. Low frequency C-band signals (less than 10 GHz) are sometimes broadcast using an antenna beamwidth approaching 6 degrees. In this case, the satellite transmits the high frequency first RF signals using a wide-beam antenna with a beamwidth of at least 6 degrees. In many implementations, the beamwidth may be significantly wider than 6 degrees.

In at least some example embodiments, the first frequency may be within the Ku band or a higher band (such as the Ka band) as the RF signals are transmitted at frequencies higher than 10 GHz. That is, the satellite may operate within the Ku band or a higher band when transmitting the RF signals. As noted above, frequencies at the Ku band and higher are considered high frequencies. Accordingly, the satellite transmits the RF signals at high frequencies.

In order to avoid interference and coordination problems with adjacent operators, the RF signals are also transmitted at a low EIRP. To achieve a low EIRP across a wide coverage area, the wide-beam antenna is adapted to have a relatively flat response.

In at least some example embodiments, a low EIRP may be a peak value less than 54 dBW for Ku-band of operation. In at least some example embodiments, a low EIRP may be a peak value less than 61 dBW for Ka-band of operation. Accordingly, the RF signals are considered emitted at a low EIRP for a high frequency of operation. It will be appreciated that, in at least some example embodiments, the emitted EIRP at contour may be approximately 46 dBW or lower (for example, for both Ku-band and Ka-band of operation). A low EIRP may be realized through use of a wide beamwidth (i.e. the beamwidth is at least 6 degrees orbital arc as compared to typical Ku-band beamwidth of 2 degrees orbital arc and Ka-band beamwidth of 1.5 degrees orbital arc) and/or through use of lower power at the transmitter (or amplifier) associated with the satellite. The satellite is configured to use an EIRP sufficient to provide effective communication connectivity to aircraft at high altitude (e.g. at least 3 km above the Earth's surface), but low enough to avoid interference issues with ground stations or receivers of adjacent satellite operators. That is, the first RF signal will be sufficiently attenuated when it reaches ground level that it will not pose an interference problem for other satellite operators.

The antenna associated with the satellite is configured to transmit the RF signals over a wide coverage area. In at least some example embodiments, the antenna of the satellite may be shaped to provide a wide beam coverage area. For example, the beamwidth of the antenna is widened to transmit the RF signals at an angle of at least about 6 degrees orbital arc. In at least some example embodiments, by shaping the antenna for wide beam coverage and adjusting for low EIRP transmission, the coverage area of a beam may encompass at least $\frac{1}{8}^{th}$ of the global surface. Accordingly, the global surface may be communicatively covered by a fewer number of beams (for example, as few as 8 beams).

As noted above, high frequency RF signals transmitted with a low EIRP may be susceptible to rain fade. However, as the RF signals are transmitted for an aircraft, the RF signals will not be affected by rain fade when the aircraft is above a certain height. For example, an aircraft that is travelling at a height of at least 3 kilometers above sea level may be above the atmospheric region susceptible to rain fade. That is, RF signals transmitted to an aircraft travelling at a height higher than 3 kilometers from sea level will not be impacted by atmospheric conditions and rain fade, and a communication link for the aircraft from the satellite will not be degraded.

It will be appreciated that, despite the wide beamwidth, the low EIRP of the transmitted RF signals from the satellite will cause less interference to adjacent satellite ground networks. This makes frequency coordination between adjacent satellites with co-frequency and co-coverage easier to perform. Additionally, the wide beam antenna may be appropriately designed in order to minimize interference with adjacent satellite ground networks.

Advantageously, some embodiments of the present system provide communications coverage with a low-power wide-beam antenna to enable high speed in-flight connectivity that would otherwise require multiple spot beam antennas with multiple high power amplifiers. Accordingly, the present system enables communications coverage with fewer beams, fewer satellite antennas, fewer receivers, and a less complex front-end receiving and output switching configuration than is conventionally required. As a result the payload of the satellite is reduced, the hardware requirements are reduced, and the resulting cost of implementing the present system as compared to spot-based coverage is significantly lower.

At operation 304, the satellite may receive second RF signals from a mobile antenna located on the aircraft when the mobile antenna is within the coverage area provided by the satellite. The second RF signals are received at a second frequency of at least 13.75 GHz that is different from the first frequency of the first RF signals.

The mobile antenna may transmit RF signals to the satellite when the aircraft is within the beam coverage area of the satellite. For example, the second RF signals may be transmitted in response to the aircraft receiving the first RF signals from the satellite. The second RF signals are transmitted at frequencies higher than 13.75 GHz. That is, the mobile antenna may operate within the Ku-band or a higher band (such as the Ka-band) when transmitting the RF signals. Accordingly, the aircraft may also transmit the second RF signals at high frequency.

In at least some example embodiments, in order for the mobile antenna to be compatible for communication with the satellite, the mobile antenna may operate within the same frequency band as the satellite. That is, the frequencies of the RF signals from the satellite (i.e. the first frequency) are transmitted within the same frequency band as the frequencies of the RF signals from the mobile antenna (i.e. the second antenna). For example, the first frequency and the second frequency may be within the Ku-band, Ka-band, etc. However, the particular first frequency and the second frequency are different in value. That is, the frequencies of the downlink RF signals from the satellite are of a different value than the frequencies of the uplink RF signals from the mobile antenna (but the values may be within the same frequency band).

In at least some example embodiments, the mobile antenna may be less than 1.2 meters. For example, a mobile antenna that is a dish antenna may have a diameter that is less than 1.2 meters. The mobile antenna may be designed of such a smaller size as the RF signals are received and transmitted by the mobile antenna at high frequencies.

As noted above, a small-sized mobile antenna may result in a wider beam which may cause interference with adjacent satellites. In at least some example embodiments, in order to minimize interference with adjacent satellites, the mobile antenna may be appropriately designed and adjusted to minimize the interference. For example, the mobile antenna may be configured for spread-spectrum transmission of the RF signals (i.e. transmitting the RF signals with a wider bandwidth), auto-track mechanisms, low MODCODE transmission of the RF (to minimize the off-axis EIRP of the mobile antenna), etc.

In at least some example embodiments, the data rate from the mobile antenna to the aircraft is at least 500 kbps. That is, the connection speed of the link from the mobile antenna to the aircraft is at a rate of at least 500 kbps. For example, based on a satellite gain over temperature (G/T) (which is a measure of the quality of an antenna for receiving data expressed as the ratio of the receive gain and the noise temperature (which is undesired energy from the satellite and an end-point (for example, the aircraft), and measured in units of kelvins)) of 0 dB/K, and the mobile antenna operating within the Ku-band of operation and emitting EIRP at 47.2 dBW, the data rate from the mobile antenna to the satellite may be around 550 kbps. In another example, based on a satellite G/T of 0 dB/K, and the mobile antenna operating within the Ka-band of operation and emitting EIRP at 53.8 dBW, the data rate from the mobile antenna to the satellite may be around 950 kbps.

It will be appreciated that the G/T of the satellite may be configured to be between −1 dB/K to 7 dB/K within the Ku-band of operation, and between −1 dB/K to 10 dB/K within the Ka-band of operation.

The data rate from the mobile antenna to the satellite is related to satellite G/T. That is, increasing the satellite G/T may increase the date rate while maintaining the emitted EIRP of the mobile antenna. Increasing the EIRP of the mobile antenna may also increase the data rate. However, in at least some example embodiments, it may be desirable to minimize the emitted EIRP of the mobile antenna. For example, in an aircraft, to increase the emitted EIRP of the associated mobile antenna, a larger transmitter (e.g. amplifier) may be required which may adversely increase the payload (which increases the operating cost of the aircraft when travelling) and cost of the antenna system on the aircraft.

As the satellite transmits a low EIRP, the corresponding gain of the associated wide-beam antenna is proportionally small at both transmission and reception. In order to increase the G/T of the satellite, in at least some example embodiments, the satellite may use separate antennas for transmitting and receiving RF signals. For example, the satellite may include an antenna for transmitting a wide beam at a high frequency and a low EIRP over a wide coverage area. The satellite may also include one or more separate receiving antennas providing reception of narrower beams at higher G/T than the transmitting antenna. Accordingly, the G/T of the receiving antenna(s) may be increased and the data rate of transfer of the mobile antenna may also be increased while maintaining the transmitting EIRP of the mobile antenna.

In at least some example embodiments, the narrow-beam receiving antenna at the satellite may be steerable. That is, the narrow-beam receiving antenna may change its position and/or orientation on the satellite to change the coverage area of the beam. For example, the narrow-beam receiving antenna may be moved to follow the direction of travel of the aircraft in order to maintain communication coverage for the travelling aircraft.

In at least some example embodiments, a ground antenna may communicate with the aircraft via the satellite. For example, a stationary antenna associated with a ground station may transmit and receive RF signals via the satellite to communicate with the aircraft. For example, in at least some example embodiments, the first RF signals from the satellite are transmitted in response to receiving third RF signals at a third frequency from the stationary antenna, and the satellite transmits fourth RF signals at a fourth frequency to the stationary antenna after receiving the second RF signals from the aircraft. An illustration of such an embodiment is provided with reference to FIG. 4 which shows an example satellite system 400.

Figure 4:
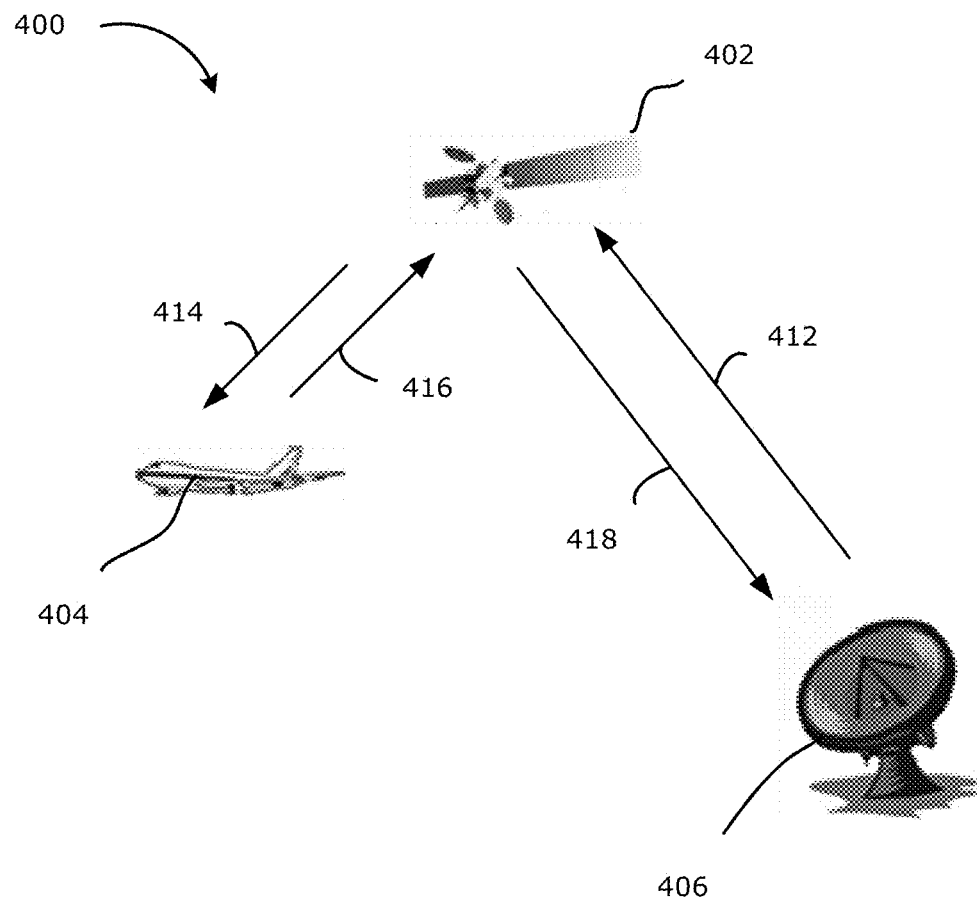
FIG. 4 is an illustration of an example satellite system in accordance with example embodiments of the present disclosure.

Referring now to FIG. 4, the satellite system 400 includes a satellite 402, an aircraft 404 having an associated mobile antenna and a ground station 406 having an associated stationary antenna.

A forward uplink 412 is established between the ground station 406 and the satellite 402. For example, third RF signals are transmitted from the ground station 406 to the satellite 402. The third RF signals may be transmitted at any frequency that is suitable for communication with the satellite 402. For example, if the satellite 402 is operating within the C-band (i.e. providing a C-band coverage), the third RF signals may be transmitted within the C-band frequency. That is, the stationary antenna may be configured for C-band frequency communication. In one example, the stationary antenna may be a larger antenna (i.e. greater than 1.2 meters in size) providing a narrower beam. In at least some other example embodiments, the frequency of communication between the ground station and the satellite may be within other frequency microwave bands such as the Ku-band, Ka-band, X-band, etc. The type of frequency may depend upon the frequency of operation of the satellite.

A forward downlink 414 is also established between the satellite 402 and the aircraft 404. For example, first RF signals are transmitted from the satellite 402 to the aircraft 404. As noted above, the first RF signals may be transmitted at a beamwidth of at least 6 degrees orbital arc, at a first frequency of at least 10 GHz, and at a low EIRP. The first RF signals may be transmitted within the Ku-band frequency or higher.

A return uplink 416 is established between the aircraft 404 and the satellite 402. For example, second RF signals are transmitted from the aircraft 404 to the satellite 402. As noted above, the second RF signals may be transmitted at a second frequency of at least 13.75 GHz. The second RF signals may be transmitted within the same frequency band as the first RF signals (for example, a Ku-band or higher) for compatibility with the satellite 402.

A return downlink 418 is also established between the satellite 402 and the ground station 406. For example, fourth RF signals are transmitted from the satellite 402 to the ground station 406. In at least some example embodiments, the fourth RF signals may be transmitted within the same microwave frequency band as the third RF signals in order for compatibility between the satellite 402 and the ground station 406. For example, if the satellite is operating within the Ku-band, the third RF signals and the fourth RF signals are transmitted within the Ku-band frequency.

Accordingly, in at least some example embodiments, the first frequency and the second frequency are within a different microwave frequency band than the third frequency and the fourth frequency. That is, the first RF signals and the second RF signals may be transmitted within a different microwave frequency band than the third RF signals and the fourth RF signals.

In another example embodiment, the first frequency and fourth frequency (i.e. the two downlink signals) are in the same band such as, for example, about 12 GHz; and the second frequency and third frequency (i.e. the two uplink signals) are in the same band such as, for example 14 GHz. Other combinations are also possible, as will be understood by those ordinarily skilled in the art having regard to the description herein.

In at least some example embodiments, the satellite 402 may relay communication services between the ground station 406 and the aircraft 404. For example, the ground station 406 may provide telephone, television, radio, internet, etc. related data communications that are accessible by the aircraft 404 via the satellite 402. In at least some example embodiments, the aircraft may obtain these communication services with high capacity.

Figure 5:
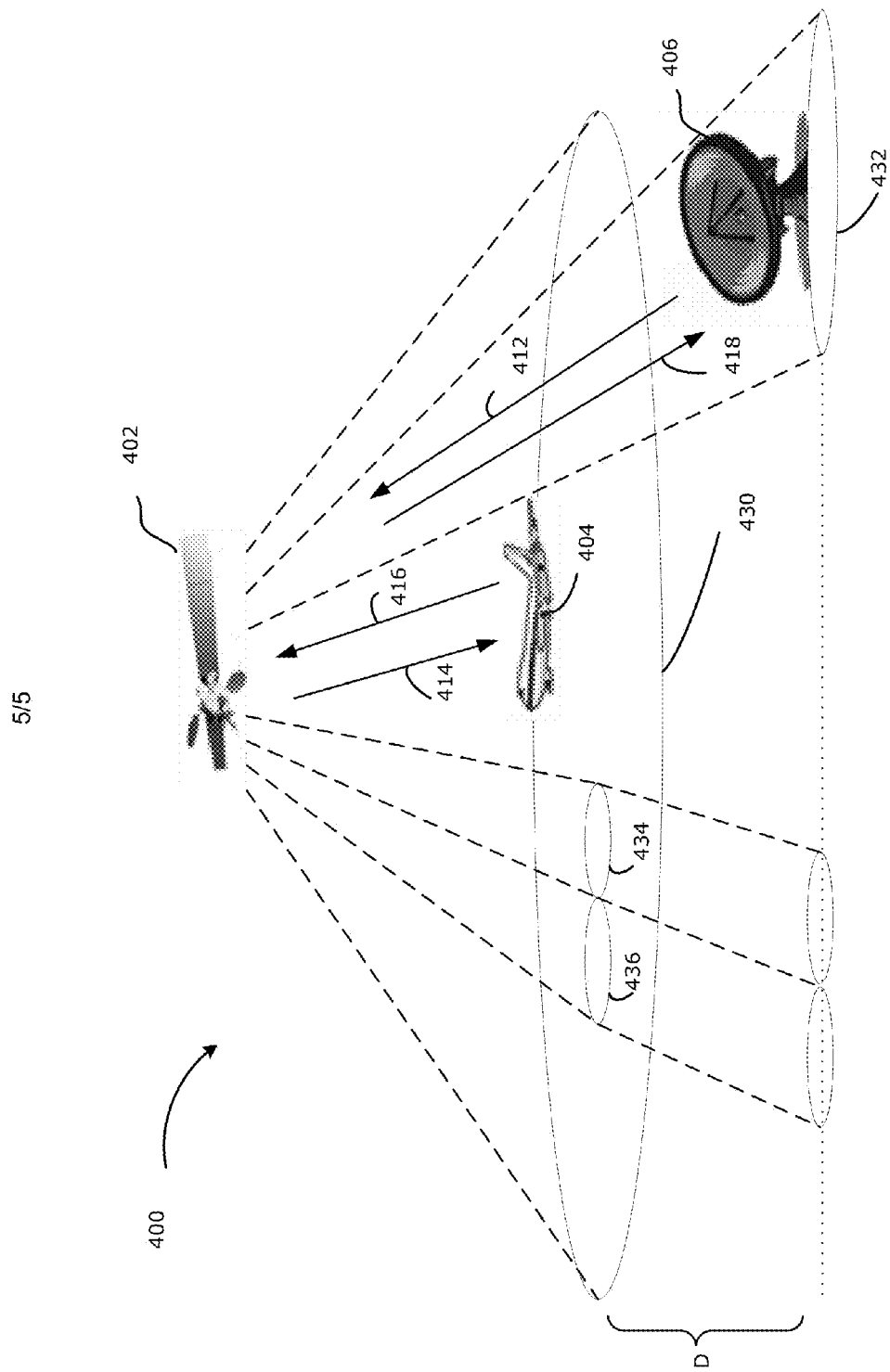
FIG. 5 is another illustration of the example satellite system of FIG. 4.

Reference is next made to FIG. 5 which shows another illustration of the satellite system 400 of FIG. 5. The satellite system 400 includes the satellite 402, the aircraft 404 and the ground station 406, and shows the communication links between them.

Additionally, the satellite system 400 includes the beam coverage of the satellite 402. For example, the first beam coverage 430 is a wide coverage provided by the satellite 402 when transmitting RF signals (for example, the first RF signals) at a high frequency and a low EIRP. The aircraft 404 which is within the first beam coverage 430 may communicate with the satellite. For example, the aircraft 404 may communicate with the satellite 402 within the same frequency band (such as the Ku-band or higher) of the first beam coverage 430.

The second beam coverage 432 is the coverage provided by the satellite 402 when transmitting RF signal (for example, the fourth RF signals) within any frequency range suitable for communication (for example, the microwave frequency band range). The ground station 406 which is within the second beam coverage 432 may communicate with the satellite 402.

For example, the ground station 406 may communicate with the satellite 402 within the same frequency band of the second beam coverage 432.

In the illustrated example, the first beam coverage 430 has a larger coverage area than the second beam coverage 432. That is, the properties of the first beam are different than the properties of the second beam. For example, the second beam may be a spot beam. That is, the second beam may have a higher EIRP than the first beam. Accordingly, the second beam coverage 432 is smaller than the first beam coverage 430.

The satellite may further provide a third beam coverage 434 and a fourth beam coverage 436. The third beam coverage 434 and the fourth beam coverage 436 may be spot beams. That is, the third beam coverage 434 and the fourth beam coverage 436 are provided with high frequency and high EIRP. Accordingly, the coverage areas of each of the third beam coverage 434 and the fourth beam coverage 436 are smaller than the coverage area of the first beam coverage 430. The spot beams may be used in receiving uplink communications from the aircraft 404. The aircraft 404 may have to perform switching/hand-over operations in order to maintain connectivity with the satellite 402 when using spot beams for uplink (i.e. the third beam coverage 434 and the fourth beam coverage 436). In some such example embodiments, the aircraft 404 may be able to maintain high-speed communications connectivity with the satellite 402 for a wide coverage area when travelling (for example, at a height D which is at least greater than 3 kilometers) within the first beam coverage 430, thereby providing a higher quality of communications service to on-board users.

As discussed above, in at least some example embodiments, the first beam coverage 430, which is a wide coverage, may encompass at least $\frac{1}{8}^{th}$ of the global surface. That is, the global surface may be communicatively covered by, for example, as few as 8 beams providing the first beam coverage 430. The wide coverage areas mean that fewer ground stations 406 may be required to relay RF signals (which may include communication services) to aircraft 404 via the satellites 402

Embodiments of the system described herein may enable the use of lower power, less complex mobile antenna equipment on aircraft. In addition, the use of wide beam coverage areas reduces the requirement for frequent switching and the need to lease different channels from satellites along the flight path.

Example embodiments of the present disclosure are not limited to any particular type of satellite or antenna. Additionally, the present disclosure is not limited to any type of aircraft which may include manned and unmanned aircrafts.

In one example application, the satellite system provides high-speed in-flight connectivity to an unmanned aircraft. The unmanned aircraft may further be configured to provide communications services to ground-level terminals (mobile or fixed), such as cellular services, in emergency or hostile (military) situations. Such an emergency situation could arrive in the case of a natural disaster when normal ground level communications infrastructure is damaged and rendered wholly or partly inoperative. An unmanned aircraft may be deployed to provide cellular or other RF-based communications coverage to the affected area, and communications via the unmanned aircraft may be relayed through the satellite system as described herein.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A method for providing high-speed connectivity to an aircraft in flight from a geosynchronous satellite, the method comprising:
    transmitting first radio frequency signals from a wide-beam antenna at the satellite towards Earth at a beamwidth of at least 6 degrees orbital arc to provide a wide coverage area, wherein the first radio frequency signals are transmitted at a first frequency of at least 10 gigahertz and at a low equivalent isotropic radiated power to avoid interference with ground stations or receivers of adjacent satellite operators; and
    receiving second radio frequency signals from a mobile antenna located on the aircraft, wherein the second radio frequency signals are received at a second frequency of at least 13.75 gigahertz, and the second frequency is different than the first frequency,
    wherein the second radio frequency signals are received at the satellite via a second satellite antenna, and wherein the second satellite antenna comprises a spot beam antenna.

2. The method of claim 1, wherein the first frequency and the second frequency are within the Ku-band or Ka-band.

3. The method of claim 1, wherein the first frequency is within the Ku-band and the low equivalent isotropic radiated power (EIRP) is a peak EIRP of 54 dBW or less.

4. The method of claim 1, wherein the first frequency is within the Ka-band and the low equivalent isotropic radiated power (EIRP) is a peak EIRP of 61 dBW or less.

5. The method of claim 1, wherein the low equivalent isotropic radiated power comprises an EIRP of no more than 46 dBW at the wide coverage area contour.

6. The method of claim 1, wherein the spot beam antenna is a steerable antenna for tracking the aircraft during its flight path.

7. The method of claim 1, wherein the aircraft is travelling at a height of at least 3 kilometers above sea level.

8. The method of claim 1, further comprising providing RF-based communications from the aircraft to a coverage zone at ground level, and wherein the RF-based communications are relayed through the satellite.

9. The method of claim 1, wherein the aircraft is an unmanned aircraft.

10. A geosynchronous satellite system for providing high-speed connectivity to an aircraft in flight, the satellite system comprising:
    a wide-beam antenna;
    a transmitter configured to transmit first radio frequency signals from the wide-beam antenna at the satellite towards Earth at a beamwidth of at least 6 degrees orbital arc to provide a wide coverage area, wherein the first radio frequency signals are transmitted at a first frequency of at least 10 gigahertz and at a low equivalent isotropic radiated power to avoid interference with ground stations or receivers of adjacent satellite operators;
    a receiver configured to receive second radio frequency signals from a mobile antenna located on the aircraft, wherein the second radio frequency signals are received at a second frequency of at least 13.75 gigahertz, and the second frequency is different than the first frequency; and a second satellite antenna connected to the receiver, and wherein the second radio frequency signals are received at the satellite via the second satellite antenna, and wherein the second satellite antenna comprises a spot beam antenna.

11. The satellite system of claim 10, wherein the first frequency and the second frequency are within the Ku-band or Ka-band.

12. The satellite system of claim 10, wherein the first frequency is within the Ku-band and the low equivalent isotropic radiated power (EIRP) is a peak EIRP of 54 dBW or less.

13. The satellite system of claim 10, wherein the first frequency is within the Ka-band and the low equivalent isotropic radiated power (EIRP) is a peak EIRP of 61 dBW or less.

14. The satellite system of claim 10, wherein the low equivalent isotropic radiated power comprises an EIRP of no more than 46 dBW at the wide coverage area contour.

15. The satellite system of claim 10, wherein the spot beam antenna is a steerable antenna for tracking the aircraft during its flight path.

16. The satellite system of claim 10, wherein the wide beam antenna and transmitter are configured to communicate with the aircraft when it is travelling at a height of at least 3 kilometers above sea level without causing interference with at ground level with adjacent satellite operators.

17. The satellite system of claim 10, wherein the aircraft is configured to provide RF-based communications from the aircraft to a coverage zone at ground level, and wherein the RF-based communications are relayed through the satellite.

18. A geosynchronous satellite for providing high-speed connectivity to an aircraft in flight, the satellite comprising:
a wide-beam antenna;
a transmitter configured to transmit first radio frequency signals from the wide-beam antenna towards Earth to a wide coverage area using a beamwidth of at least 6 degrees orbital arc, wherein the first radio frequency signals are transmitted at a first frequency of at least 10 gigahertz and at a low equivalent isotropic radiated power to avoid interference with ground stations or receivers of adjacent satellite operators;
a spot beam antenna; and
a receiver configured to receive second radio frequency signals through the spot beam antenna from a mobile antenna located on the aircraft, wherein the second radio frequency signals are received at a second frequency of at least 13.75 gigahertz, and the second frequency is different than the first frequency.

19. The satellite of claim 18, wherein the spot beam antenna is a steerable antenna for tracking the aircraft along its flight path.

* * * * *